US010712779B2

(12) United States Patent
Reddy et al.

(10) Patent No.: US 10,712,779 B2
(45) Date of Patent: Jul. 14, 2020

(54) UNIFIED CHASSIS CONSTRUCTION FOR ALL IN ONE COMPUTER

(71) Applicant: INTEL CORPORATION, Santa Clara, CA (US)

(72) Inventors: Anand V. Reddy, Bangalore (IN); Guru Prakash, Bangalore (IN); Harish Jagadish, Bangalore (IN); Arvind Sundaram, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/529,050

(22) PCT Filed: Dec. 7, 2015

(86) PCT No.: PCT/US2015/064328
§ 371 (c)(1),
(2) Date: May 23, 2017

(87) PCT Pub. No.: WO2016/111790
PCT Pub. Date: Jul. 14, 2016

(65) Prior Publication Data
US 2017/0255233 A1    Sep. 7, 2017

(30) Foreign Application Priority Data

Jan. 5, 2015    (IN) .............................. 78/CHE/2015

(51) Int. Cl.
*G06F 1/16*    (2006.01)
*H05K 5/00*    (2006.01)
(Continued)

(52) U.S. Cl.
CPC .......... *G06F 1/1637* (2013.01); *G06F 1/1626* (2013.01); *G06F 1/1635* (2013.01); *G06F 1/1656* (2013.01); *G06F 1/3212* (2013.01)

(58) Field of Classification Search
CPC ..... G06F 1/1637; G06F 1/1635; G06F 1/1656
(Continued)

(56) References Cited

U.S. PATENT DOCUMENTS 5,831,816 A * 11/1998 Johns ............... F16M 11/10
                                                        361/679.21
6,532,152 B1 * 3/2003 White ............... G02F 1/133308
                                                        312/223.1
(Continued)

OTHER PUBLICATIONS

International Searching Authority at the Korean Intellectual Property Office, International Search Report and Written Opinion for International Patent Application No. PCT/US2015/064328, dated Apr. 1, 2016, 13 pages.

(Continued)

*Primary Examiner* — Anthony M Haughton
(74) *Attorney, Agent, or Firm* — Womble Bond Dickinson (US) LLP (57) ABSTRACT

Embodiments are generally directed to a unified chassis construction for an all in one computer. An embodiment of a computer system includes a computer sub-system to provide computer operation; a display sub-system to provide display operation; a unified plate, components installed in the unified plate including at least one or more computer sub-system components and one or more display sub-system components; and a display screen coupled with the unified plate.

25 Claims, 7 Drawing Sheets

(51) Int. Cl.
*H05K 7/00* (2006.01)
*G06F 1/3212* (2019.01)

(58) Field of Classification Search
USPC .... 361/679.21–679.3, 679.55, 679.56, 679.6
See application file for complete search history.

(56) References Cited

U.S. PATENT DOCUMENTS

| 7,733,635 | B2* | 6/2010 | Sullivan | G06F 1/1601 |
| | | | | 361/679.01 |
| 9,092,200 | B2* | 7/2015 | Richard | F16M 11/10 |
| 9,552,022 | B2* | 1/2017 | Gotham | H05K 5/02 |
| 9,588,550 | B2* | 3/2017 | Smith | G06F 1/1613 |
| 9,710,033 | B2* | 7/2017 | Yamazaki | G06F 1/1635 |
| 2003/0063432 | A1* | 4/2003 | Farrow | G06F 1/1601 |
| | | | | 361/679.02 |
| 2008/0024971 | A1 | 1/2008 | Jackson, Jr. | |
| 2010/0205336 | A1 | 8/2010 | Kakish | |
| 2011/0176268 | A1 | 7/2011 | Kuang et al. | |
| 2013/0021747 | A1 | 1/2013 | Guan | |
| 2013/0179712 | A1 | 7/2013 | Tsai et al. | |

OTHER PUBLICATIONS

PCT Application No. PCT/US2015/064328, International Preliminary Report and the Written Opinion, dated Jul. 11, 2017, 12 pgs.
Indian Office Action for Application No. 78/CHE/2015, dated Sep. 13, 2019, 6 pages.

* cited by examiner

FIG. 8

UNIFIED CHASSIS CONSTRUCTION FOR ALL IN ONE COMPUTER

CROSS-REFERENCE TO RELATED APPLICATION

This patent application is a U.S. National Phase Application under 35 U.S.C. 071 of International Application No. PCT/US2015/064328, filed Dec. 7, 2015, entitled UNIFIED CHASSIS CONSTRUCTION FOR ALL IN ONE COMPUTER, which claims benefit to India Application No. 75/CHE/2015, filed on Jan. 5, 2015, the entire contents of which are incorporated by reference.

TECHNICAL FIELD

Embodiments described herein generally relate to the field of electrical devices and, more particularly, to a unified chassis construction for an all in one computer.

BACKGROUND

Among the different forms for computers is a portable all in one (pAIO) computer. In general, an all in one computer is a unit in which a display, interface elements, and processing elements are combined into a single unit.

Portable all in one is a relatively new and fast growing category of computers. These devices generally have larger screens for multi-user interactions. In addition, these devices have a battery and are expected to be lightweight in order to make it easier for a unit to be carried around a home or business (mobile within the house).

Because of the in-house mobility expectation of a pAIO, one of the critical design targets for such a unit is weight reduction. The weight of pAIOs is a function of the screen size, with systems commonly weighing more than 8.5 pounds for a screen size of approximately 21 inches.

However, the portability of a portable all in one computer can be significantly compromised by the weight of the device, which thus limits the screen size that can be practically used.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to unified chassis for an all in one computer.

For the purposes of this description:

"All in one computer" or "AIO" means a computer apparatus or system in which display, computer, and other elements are combined into a single unit.

"Portable all in one computer" or "pAIO" means an all in one computer that is intended for portability. The term "all in one computer" includes a portable all in one computer.

An all in one computer generally include a larger display, which may be particularly useful for certain purposes, including cooperative uses of the computer in which multiple users are viewing the computer display, accessing the computer, or both at the same time.

A conventional all in one computer is a unit that, in additional to the display glass itself, requires a display plate for support of display components and a computer chassis for support of computer components, the computer chassis including a second plate (mid-plate) and a back cover, wherein each of the display plate and mid-plate being of large size and requiring significant strength to support the display and computer elements. The combination of such elements can result in a total weight that is difficult to lift and move.

In conventional production, the display sub-system, to provide display operation and the computer sub-system, to provide computer operation, of an all in one computer are designed independently from each other. Commonly, a display manufacturer designs and builds a display system, including a display plate containing a display controller and other electronics for the display installed on a display plate. The display system may be provided to a computer system manufacturer, wherein the computer system manufacturer installs a computer motherboard, memory, and other electronics on a mid-plate and back cover to provide structural support for the computer, with the back cover, mid-plate, and display plate being combined into an all in one system. Other components that are not germane to the current discussion may also be included in the all in one system.

In some embodiments, in contrast to the structure of a conventional system, an all in one computer system (such as a portable all in one system) includes a unified plate (which may also be referred to a unified chassis plate or unified structural plate) that reduces the system weight through a new design methodology. In some embodiments, a unified system chassis for the computer system includes the unified plate and a back cover, the unified chassis plate to be enclosed at least in part by the back cover. In some embodiments, one or more computer components and one or more display components are to be coupled with the unified plate. The computer chassis and display panel are the two biggest weight elements in a pAIO. In traditional design methodology, with the computer sub-system being designed independently of the display sub-system, the overall system weight is not optimal. In some embodiments, a new holistic design methodology reduces the system weight by combining the structural elements of the computer chassis and display panel. While a combined design of an all in one computer may potentially increase design costs, such costs are fixed costs that may be offset by the reduced cost of materials in each computer system unit. Further, the combined design may allow for joint use of certain components to support both the computer sub-system and the display sub-system, thus reducing the number of electronic components required for the computer system.

In some embodiments, an all in one computer with a unified plate, in additional to providing a reduced system weight, also provides a reduced thickness of the unit because the elimination of one of the structural plates. In this manner, a more streamlined design for a computer system may be provided. A display screen for an embodiment of an all in one computer may include, but is not limited to, a liquid crystal display (LCD) touch screen.

In conventional designs, the display plate and the computer mid-plate are each constructed of metal (such as a form of steel) to provide sufficient strength for the computer structure. In some embodiments, to provide further weight savings in the construction of an all in one computer, a unified plate is constructed of carbon fiber reinforced plastic or similar non-metallic material to provide high strength with reduced weight. While material such as carbon fiber is a relatively expensive material, costs of such material are generally falling, and, in embodiment of an all in one computer, only a single plate is required, thus reducing the amount of carbon fiber material needed for the construction of an all in one computer system.

Figure 1:
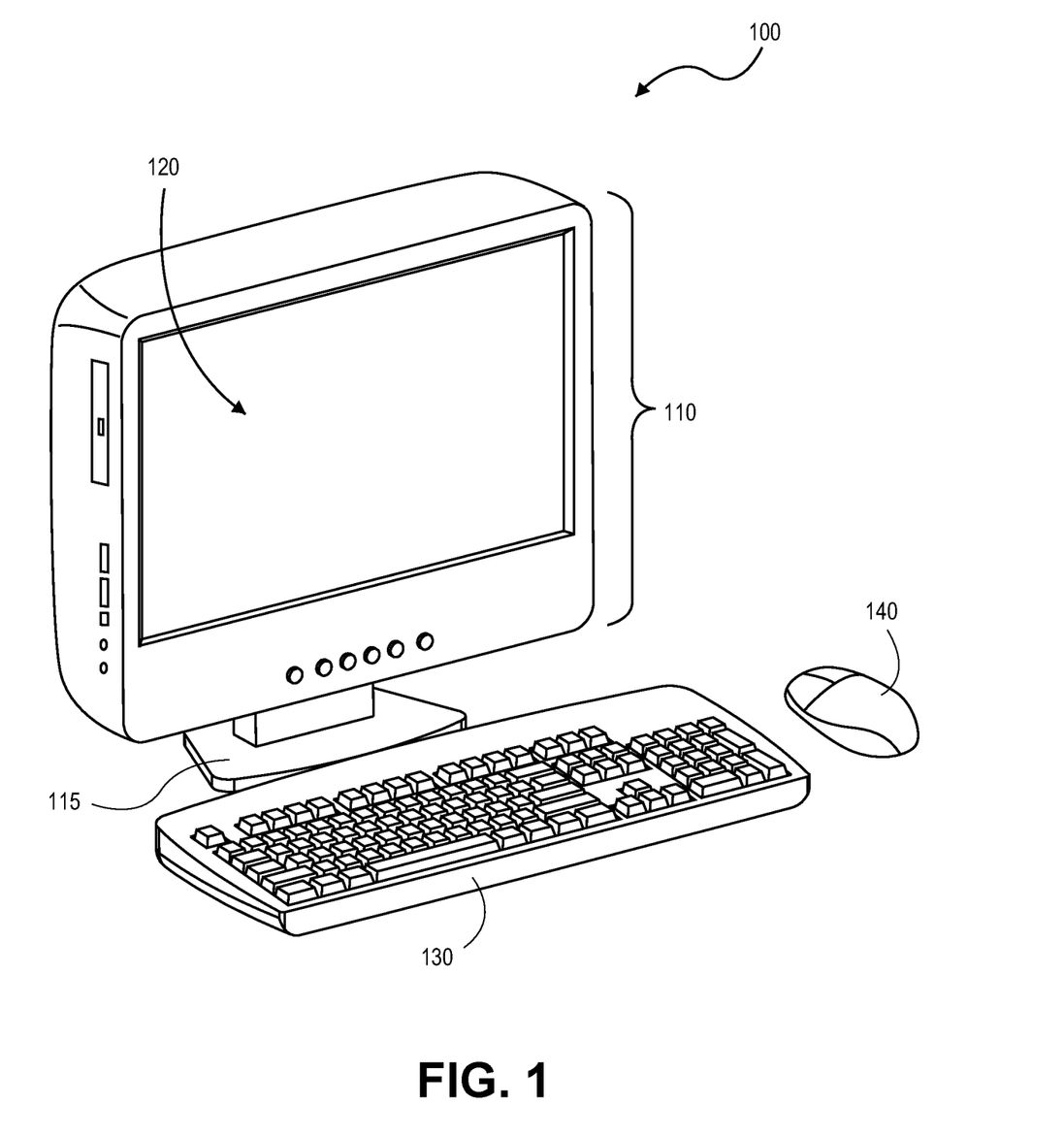
FIG. 1 is an illustration of an all in one computer (AIO) system according to an embodiment.

FIG. 1 is an illustration of an all in one computer (AIO) system according to an embodiment. An AIO 100 includes a single unit 110 that includes the display 120 of the system 100. The single unit contains a computer sub-system to provide computer operation, which may include generation of video signals, and a display sub-system to provide display operation, including generation of images using the video signals. The computer sub-system and display sub-system may be interconnected for the transmission of signals including the video signals. The display 120 may include, but is not limited to, an LCD touch screen display. In this illustration the single unit may include or be connectable to a stand 115 to provide stability, raise a height of the system 100, or both. While not illustrated in FIG. 1, the AIO may include integrated speakers to provide audio output, a video camera to record images, and other common elements of a computer system.

A system 100 may include interfaces or ports for external hardware, including, but not limited to, input devices such as a keyboard 130 and a mouse 140 or similar input device, such a trackball or touchpad. In other implementation, one or more input devices may be integrated into the single unit 110. A portable all in one system may include elements for portability, including a battery power source.

In some embodiments, the unit 110 includes a unified plate, the unified plate being a single unified support means to support components for both the display sub-system of the system 100 and the computer sub-system of the system 100.

Figure 2:
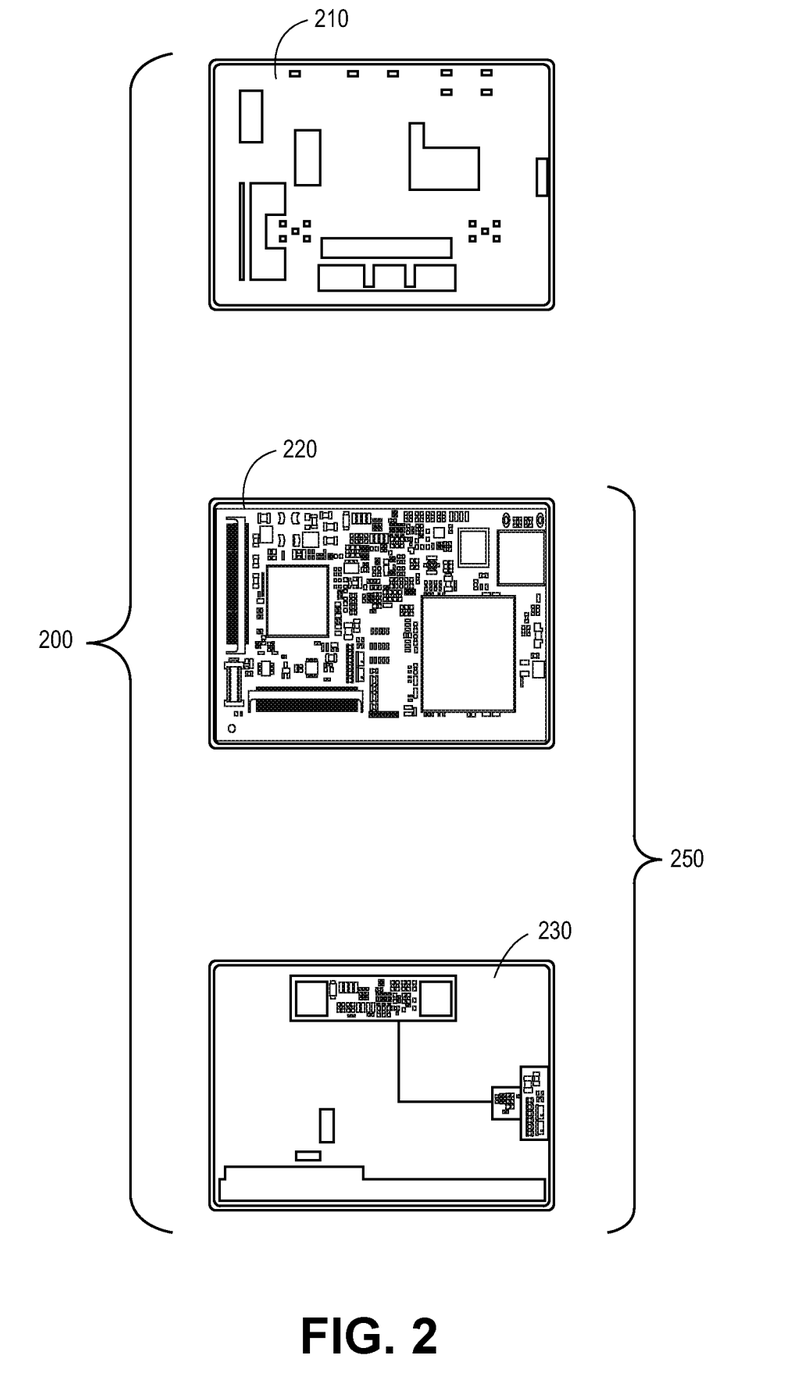
FIG. 2 is an illustration of structural elements of an all in one computer system.

FIG. 2 is an illustration of structural elements 200 of an all in one computer system. In a conventional design of an all in one computer, the chassis of the computer has two structural elements, such elements being the back cover or skin 210 and the mid-plate 220, as shown in FIG. 2. The display panel has its own structural element, such element being a metal display plate 230 providing support to the display panel elements.

In some embodiments, the functions of the mid-plate and the panel support plate are combined into a unified plate 250 for support of elements of both the computer sub-system and the display sub-system to yield weight savings and reduced thickness for an all in one computer. While precise weight values are dependent on many factors in an embodiment, in a particular example of a 23.5 inch display system implementation, a unified structural design utilizing a unified plate for the computer sub-system and display sub-system is estimated to save approximately 12-18% of the system weight in comparison with a conventional all in one computer system.

Figure 3:
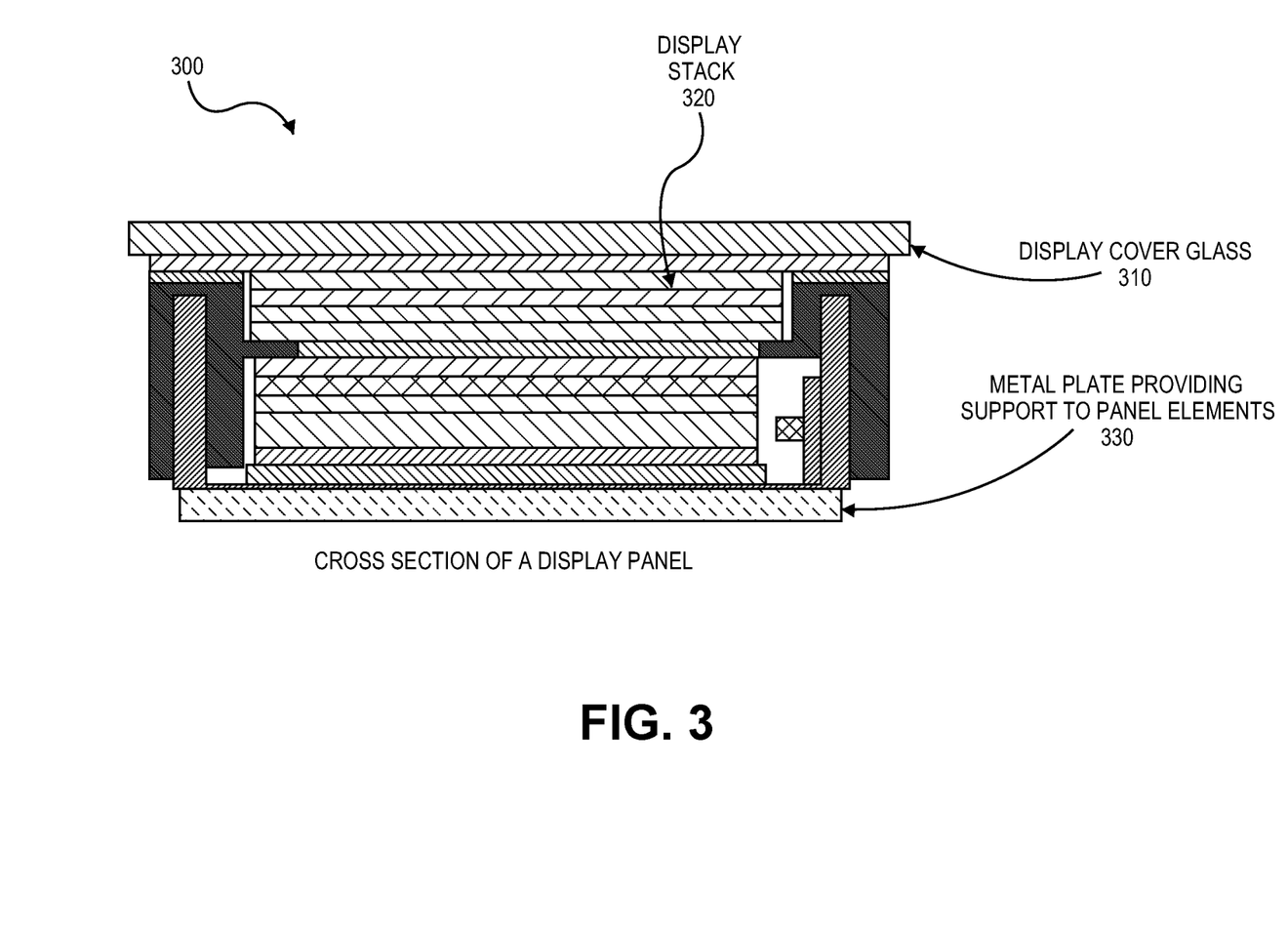
FIG. 3 is an illustration of a display panel with plate support.

FIG. 3 is an illustration of a display panel with plate support. In the cross section view of a conventional display panel 300, there is illustrated a display cover glass 310 for the front of the display; the display stack 320, which is commonly composed of several flexible sheet-like layers of materials; and a solid metal plate to provide support to the panel elements 330.

In traditional design of an all in one computer, the panel 300 is designed independently of the rest of the system and then assembled into the system. In some embodiments, in a new integrative design, the system is optimized for weight by combining the mid-plate with the display panel plate 330 to form the main structural element.

Figure 4:
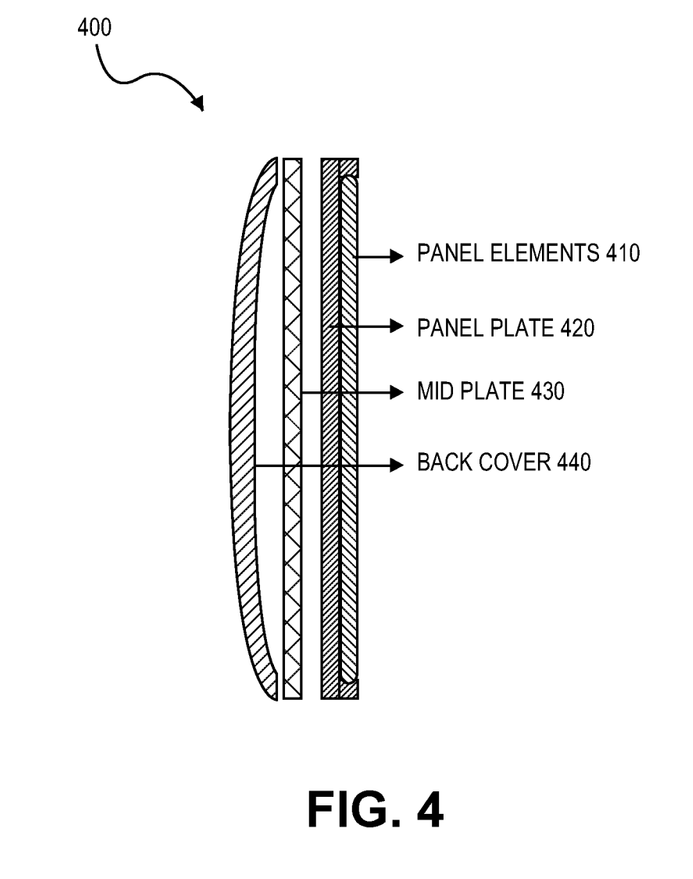
FIG. 4 is an illustration of structural elements of a conventional all in one computer system.

FIG. 4 is an illustration of structural elements of a conventional all in one computer system. In the AIO 400, the structural elements include panel elements 410, such as the display cover glass 310 and display stack 320 illustrated in FIG. 1; a panel plate 420, such as the plate 330 illustrated in FIG. 3; a mid-plate 430 to support computer sub-system components, such as the mid-plate 220 illustrated in FIG. 2; and a back cover 440, such as the back cover 210 illustrated in FIG. 2. As illustrated in FIG. 4, the separate computer chassis including the back cover 440 and mid-plate 430 in addition to the panel plate 420 and panel elements 410 results in a relatively thick and heavy computer unit 400.

Figure 5:
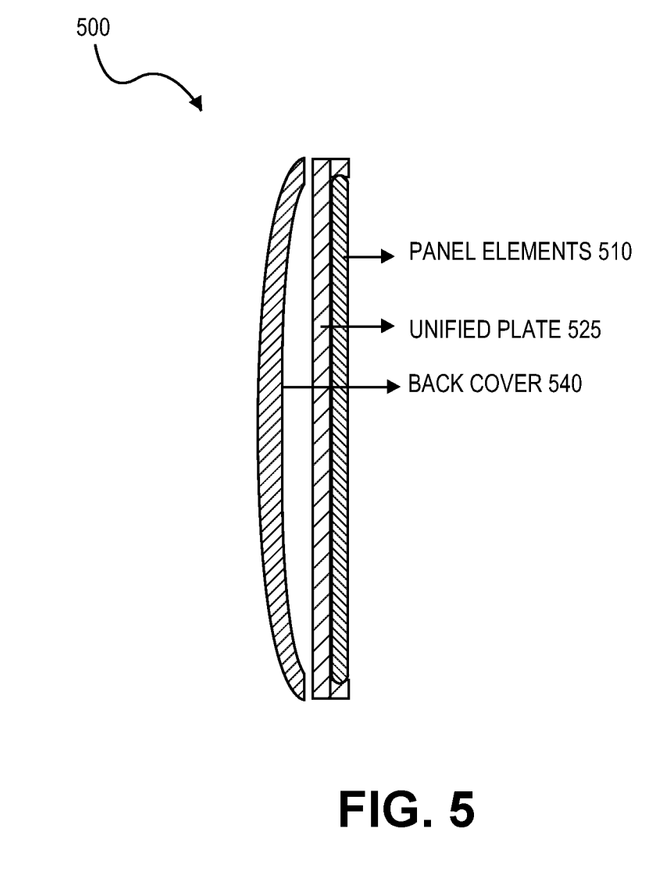
FIG. 5 is an illustration of structural elements of an all in one computer system according to an embodiment.

FIG. 5 is an illustration of structural elements of an all in one computer system according to an embodiment. In some embodiments, the structural elements of AIO 500 include panel elements 510; a unified plate 525 to support computer sub-system components and display sub-system components; and a back cover 540. As provided in FIG. 5, a unified system chassis, including the back cover 540 and the unified plate 525, coupled with the panel elements 510 results in a computer system 500 that may be thinner and lighter in comparison with a conventional design.

Figure 6:
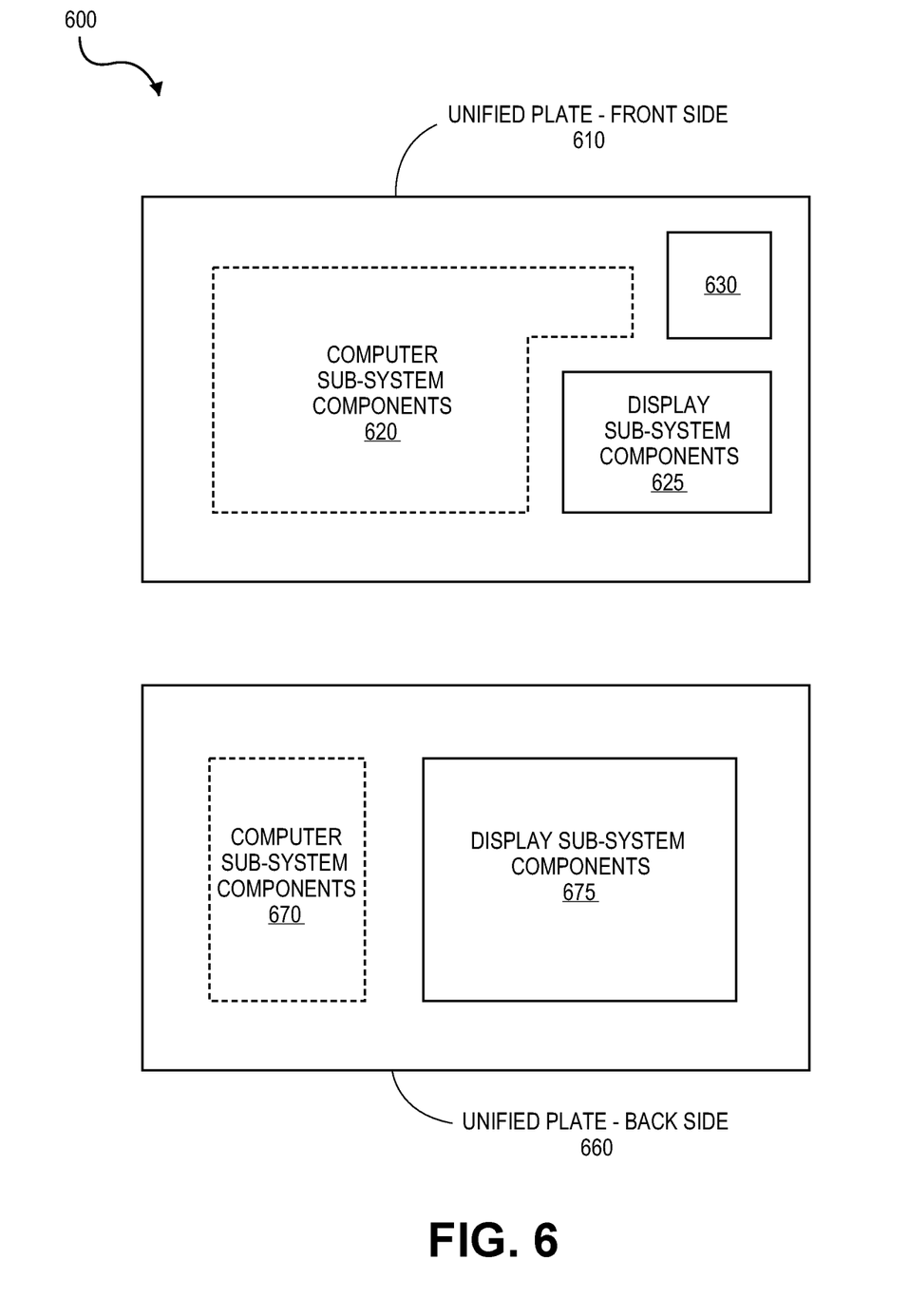
FIG. 6 is an illustration of a unified plate for a chassis structure of an all in one computer.

FIG. 6 is an illustration of a unified plate for a chassis structure of an all in one computer. In some embodiments, a unified chassis plate 600 is used to provide joint structural support for at least computer sub-system components and display sub-system components. The unified plate 600 may be, for example, the unified plate 525 illustrated in FIG. 5. In some embodiments, the unified plate 600 may be utilized for additional purposes as well. In some embodiments, the unified plate includes a first front side 610 (facing the display screen) and a second back side 660 (facing away from the display screen, towards the back cover of the all in one computer).

In some embodiments, each of the front side 610 and back side 660 of the unified plate 600 includes areas in which computer sub-system components are to be installed and areas in which display sub-system components are to be installed. In one possible example, the front side 610 may include a first area 620 to be utilized for computer components and a second area 625 to be utilized for display sub-system components, and the back side 660 may include a first area 670 to be utilized for computer sub-system components and a second area 675 to be utilized for display sub-system components. In some embodiments, the unified plate 600 may include other areas, such as area 630, for components that provide joint support for the computer sub-system and the display sub-system or provide another function. Further, the first side and second side may be reversed, or either the first side or second side of the unified board may exclusively include either computer sub-system components or display sub-system components.

In this manner, a display manufacturer and computer manufacturer may cooperatively design computer and display electronics. The computer manufacturer may install compute sub-system components in the unified plate in appropriate locations, and the display manufacturer then install display sub-system components into the unified plate in appropriate locations and install the display. The full unit may then be constructed to manufacture the all in one computer system.

Figure 7:
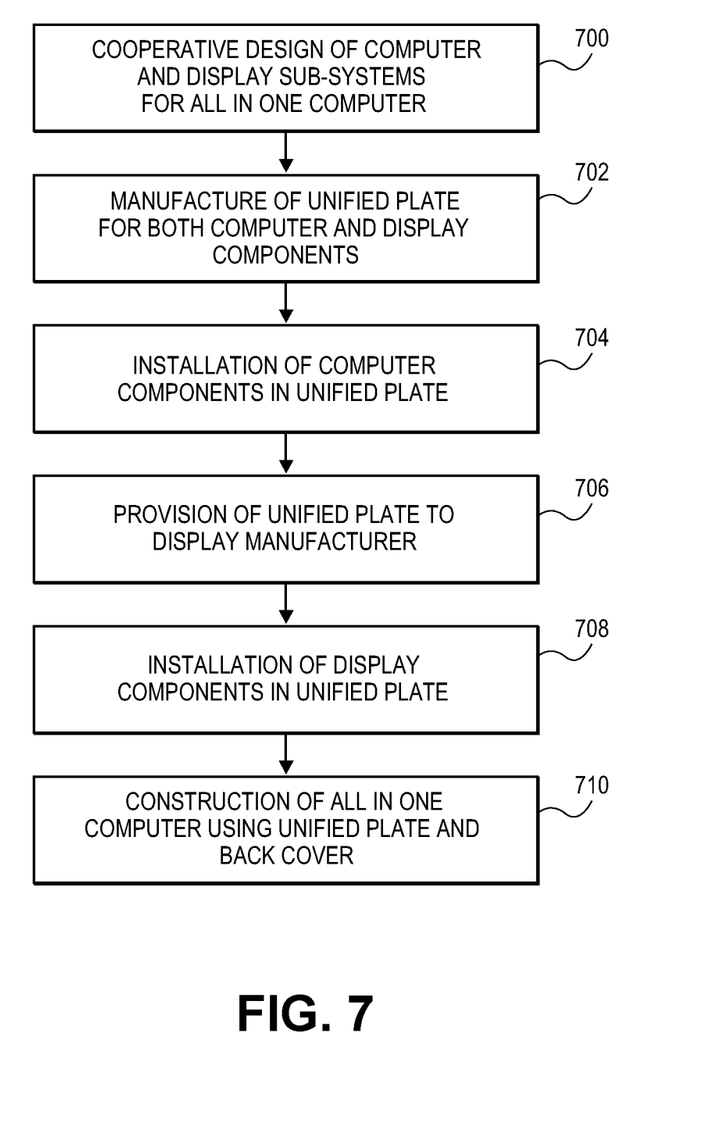
FIG. 7 is a flowchart to illustrate a process for manufacture of an all in one computer according to an embodiment.

FIG. 7 is a flowchart to illustrate a process for manufacture of an all in one computer according to an embodiment. It is noted that the process described here is a simplified process that does not include all of the tasks to be performed in the manufacturing process. Further, the processes may occur in varying orders of performance.

In some embodiments, there may be a cooperative design of computer and display sub-systems for an all in one computer 700. Cooperative designing of a computer system may include, but is not limited to, an initial design of a computer sub-system and the provision of such design to a display manufacturer, or vice versa. The design includes a design for or standards for an all in one computer.

In some embodiments, a unified plate for both computer sub-system and display sub-system components is manufactured 702. In some embodiments, the process may proceed with the installation of computer sub-system components in the unified plate 704; provision of the unified plate to the display manufacturer 706; and installation of the display sub-system components in the unified plate 708. In some embodiments, the process then proceeds with construction of the all in one computer using the unified plate and a back cover 710.

Figure 8:
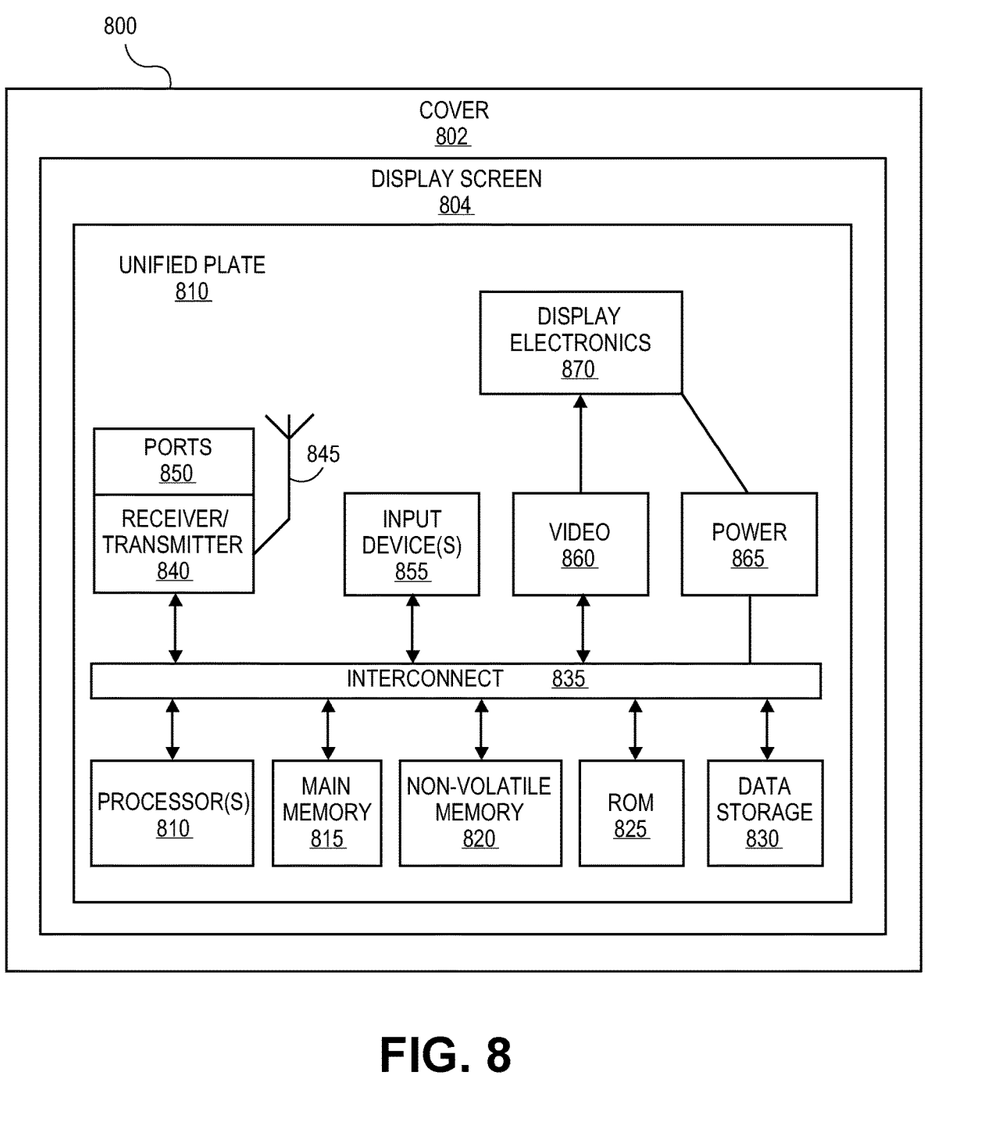
FIG. 8 illustrates an all in one computer system according to an embodiment.

FIG. 8 illustrates an all in one computer system according to an embodiment. In this illustration, certain standard and well-known components that are not germane to the present description are not shown. In some embodiments, an all in one computer system (referred to generally as a system) 800 includes a cover or housing 802, a display screen 804, and a unified plate 810, wherein the unified plate is contained at least in part within the cover 802, the unified plate 810 providing support for at least computer components and display components for the system 800, one or more computer components and one or more display components being coupled with the unified plate. The cover 802 and unified plate 810 provide a unified system chassis for the system 800.

In some embodiments, the system 800 includes buses and other communication means for transmission of data, which are illustrated as an interconnect 835. The interconnect 835 is illustrated as a single interconnect for simplicity, but may represent multiple different interconnects or buses and the component connections to such interconnects may vary. The interconnect 835 shown in FIG. 8 is an abstraction that represents any one or more separate physical buses, point-to-point connections, or both connected by appropriate bridges, adapters, or controllers.

The system 800 includes a processing means such as one or more processors 810 coupled to the interconnect 835 for processing information. The processors 810 may comprise one or more physical processors and one or more logical processors.

In some embodiments, the system 800 further comprises a random access memory (RAM) or other dynamic storage device or element as a main memory 815 for storing information and instructions to be executed by the processors 810. RAM includes dynamic random access memory (DRAM), requiring refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The system 800 may include one or more non-volatile memory elements 820, including, for example, flash memory, for the storage of certain elements. The system 800 also may comprise a read only memory (ROM) 825 or other static storage device for storing static information and instructions for the processors 810, and data storage 830, such as a solid state drive (SSD), for the storage of data.

In some embodiments, the system 800 includes one or more transmitters or receivers (or combined transceiver) 840 coupled to the interconnect 835. In some embodiments, the system 800 may include one or more antennas 845 for the transmission and reception of data via wireless communication, including, for example, Wi-Fi, Bluetooth®, and near field communication (NFC) communications. In some embodiments, the system 800 includes one or more ports 850 for the transmission and reception of data via wired communication, including, for example USB® (Universal Serial Bus) and FireWire® ports, and for the connection of external devices.

In some embodiments, the system 800 includes one or more input devices 855 for the input of data, including hard and soft buttons, a joy stick, a mouse or other pointing device, voice command system, or gesture recognition system. In some embodiments, the system 800 is operable to receive control data from a user via the input devices 855.

In some embodiments, the system 800 includes a video driver or elements to generate video signals 860, which may include a graphical processing unit (GPU). In some embodiments, the system 800 includes display electronics 870 for the display screen 804, the display electronics to receive the video signals and generate images using the video signals. The display screen 804 may include a liquid crystal display (LCD), organic light emitting display (OLED), or any other display technology for displaying information or content to a user. In some environments, the display screen 804 may include a touch screen that is also utilized as at least a part of an input device 855.

The system 800 may also include a power source 865. The power provided by the power source 865 may be distributed as required to elements of the system 800. As illustrated, the power source may be a single power source to provide power to both the display electronics and computer electronics, but different power structures may exist for varying embodiments of the system 800. The power source 865 may include, but is not limited to, a battery, such as a rechargeable battery, for a portable all in one system.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a computer apparatus includes a computer sub-system to provide computer operation; a display sub-system to provide display operation; a unified plate, components installed in the unified plate including at least one or more computer sub-system components and one or more display sub-system components; and a display screen coupled with the unified plate.

In some embodiments, the unified plate is the sole chassis plate of the computer apparatus.

In some embodiments, the unified plate is made of metal.

In some embodiments, the unified plate is made of a non-metallic material. In some embodiments, the non-metallic material is carbon fiber reinforced plastic.

In some embodiments, the computer sub-system is to generate video signals. In some embodiments, the display sub-system is to receive the video signals from the computer sub-system and to generate an image using the video signals.

In some embodiments, the one or more computer sub-system components include a processor and a memory.

In some embodiments, components installed in the unified plate further include one or more components that support both the computer sub-system and the display sub-system.

In some embodiments, the computer apparatus is at least a portion of an all in one computer system.

In some embodiments, the display screen is a liquid crystal display (LCD) touch screen.

In some embodiments, the computer apparatus further includes a battery to provide power for the computer sub-system and display sub-system.

In some embodiments, a all in one computer system includes a computer sub-system to provide computer operation; a display sub-system to provide display operation; a unified system chassis including a unified chassis plate, one or more computer sub-system components and one or more display sub-system components being coupled with the unified chassis plate, and a back cover, the unified chassis plate to be enclosed at least in part by the back cover; and a display screen coupled with the unified plate.

In some embodiments, the one or more computer sub-system components include a central processing unit (CPU) and a random access memory (RAM).

In some embodiments, the one or more display sub-system components include display electronics.

In some embodiments, the computer system is a portable all in one computer system, the computer system further including a battery to provide power for the computer system.

In some embodiments, the unified plate is made of a non-metallic material. In some embodiments, the non-metallic material is carbon fiber reinforced plastic.

In some embodiments, the computer system further includes one or more ports for communications or for connection of external devices.

In some embodiments, the display screen is a liquid crystal display (LCD) touch screen.

In some embodiments, an apparatus includes a chassis plate for support of electronic components; components for a computer sub-system installed in the chassis plate in a first area of the chassis plate, the computer sub-system components including one or more components to generate video signals; and components for a display sub-system installed in the chassis plate in a second area of the chassis plate, the display sub-system including display electronics to receive the video signals, wherein the display electronics are operable to control a display to be coupled with the chassis plate.

In some embodiments, the chassis plate is made of a non-metallic material. In some embodiments, wherein the chassis plate is made of carbon fiber reinforced plastic.

In some embodiments, the apparatus further includes a third area. In some embodiments, the third area includes components to support both the computer sub-system and the display sub-system.

In some embodiments, the chassis plate includes a first side and a second side, a first portion of each of the first area and second being on the first side and a second portion of each of the first area and second being on the second side.

In some embodiments, the chassis plate is a part of a unified chassis system for a computer system.

In some embodiments, the computer sub-system components include a central processing unit (CPU) and a random access memory (RAM).

In some embodiments, a computer apparatus includes a computer sub-system to provide computer operation including generation of video signals; a display sub-system to provide display operation including generation of an image using the video signals; a single unified support means to support both one or more computer sub-system components and one or more display sub-system components; and a display screen coupled with the unified support means.

What is claimed is:

1. A computer apparatus comprising:
   a computer sub-system to provide computer operation;
   a display sub-system to control display operation;
   a unified plate, wherein the unified plate is a single plate, the components installed in the unified plate including at least one or more computer sub-system components and one or more display sub-system components on a front side of the unified plate; and
   a display screen coupled with the front side of the unified plate.

2. The apparatus of claim 1, wherein the unified plate is the sole chassis plate of the computer apparatus.

3. The apparatus of claim 1, wherein the unified plate is made of metal.

4. The apparatus of claim 1, wherein the unified plate is made of a non-metallic material.

5. The apparatus of claim 4, wherein the non-metallic material is carbon fiber reinforced plastic.

6. The apparatus of claim 1, wherein the computer sub-system is to generate video signals.

7. The apparatus of claim 6, wherein the display sub-system is to receive the video signals from the computer sub-system and to generate an image using the video signals.

8. The apparatus of claim 1, wherein the one or more computer sub-system components include a processor and a memory.

9. The apparatus of claim 1, wherein components installed in the unified plate further include one or more components that support both the computer sub-system and the display sub-system.

10. The apparatus of claim 1, wherein the computer apparatus is at least a portion of an all in one computer system.

11. An all in one computer system comprising:
    a computer sub-system to provide computer operation;
    a display sub-system to control display operation;
    a unified system chassis including:
    a unified chassis plate, wherein the unified plate is a single plate, the one or more computer sub-system components and one or more display sub-system components being coupled with a front side of the unified chassis plate, and
    a back cover, the unified chassis plate to be enclosed at least in part by the back cover; and
    a display screen coupled with the front side of the unified plate.

12. The computer system of claim 11, wherein the one or more computer sub-system components include a central processing unit (CPU) and a random access memory (RAM).

13. The computer system of claim 11, wherein the one or more display sub-system components include display electronics.

14. The computer system of claim 11, wherein the computer system is a portable all in one computer system, the computer system further comprising a battery to provide power for the computer system.

15. The computer system of claim 11, wherein the unified plate is made of a non-metallic material.

16. The computer system of claim 15, wherein the non-metallic material is carbon fiber reinforced plastic.

17. The computer system of claim 11, further comprising one or more ports for communications or for connection of external devices.

18. The computer system of claim 11, wherein the display screen is a liquid crystal display (LCD) touch screen.

19. The computer system of claim 11, wherein the computer operation is to include generation of video signals, and wherein the display operation is to include display of the video signals.

20. An apparatus comprising:
    a single chassis plate for support of electronic components;
    components for a computer sub-system installed in the chassis plate in a first area of the chassis plate, the computer sub-system components including one or more components to generate video signals; and
    components for a display sub-system installed on a front side of the chassis plate in a second area of the chassis plate, the display sub-system including display electronics to receive the video signals;
    wherein the display electronics are operable to control a display to be coupled with the front side of the chassis plate.

21. The apparatus of claim 20, wherein the chassis plate is made of a non-metallic material.

22. The apparatus of claim 21, wherein the chassis plate is made of carbon fiber reinforced plastic.

23. The apparatus of claim 20, wherein the chassis plate further includes a third area.

24. The apparatus of claim 23, wherein the third area includes components to support both the computer sub-system and the display sub-system.

25. The apparatus of claim 20, wherein the chassis plate includes a first side and a second side, a first portion of each of the first area and second being on the first side and a second portion of each of the first area and second being on the second side.

* * * * *